United States Patent
Yoon et al.

(10) Patent No.: US 9,894,347 B2
(45) Date of Patent: Feb. 13, 2018

(54) 3D IMAGE ACQUISITION APPARATUS AND METHOD OF DRIVING THE SAME

(71) Applicant: SAMSUNG ELECTRONICS CO., LTD., Suwon-si (KR)

(72) Inventors: Hee-sun Yoon, Seoul (KR); Jang-woo You, Yongin-si (KR); Yong-hwa Park, Yongin-si (KR); Yong-chul Cho, Suwon-si (KR); Min-chul Yu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 14/252,086

(22) Filed: Apr. 14, 2014

(65) Prior Publication Data

US 2014/0347445 A1   Nov. 27, 2014

(30) Foreign Application Priority Data

May 22, 2013   (KR) .................. 10-2013-0057955

(51) Int. Cl.
*H04N 13/00* (2006.01)
*H04N 13/02* (2006.01)
(Continued)

(52) U.S. Cl.
CPC ......... *H04N 13/0271* (2013.01); *G01S 7/481* (2013.01); *G01S 17/89* (2013.01)

(58) Field of Classification Search
CPC ...... H04N 13/0271; G01S 17/89; G01S 7/481
(Continued)

(56) References Cited

U.S. PATENT DOCUMENTS 4,935,616 A   6/1990   Scott
5,081,530 A * 1/1992   Medina .................. G01S 7/48
                                                        348/371
(Continued)

FOREIGN PATENT DOCUMENTS

EP           2 587 276 A1      5/2013
KR    10-2010-0084018 A        7/2010
(Continued)

OTHER PUBLICATIONS

C. Joenathan; "Phase-measuring interferometry: new methods and error analysis"; Applied Optics; Jul. 1, 1994; vol. 33, No. 19; pp. 4147-4155.

(Continued)

*Primary Examiner* — Zhihan Zhou
(74) *Attorney, Agent, or Firm* — Sughrue Mion, PLLC

(57) ABSTRACT

Provided is a 3-dimensional (3D) image acquisition apparatus and a method of driving the same. The 3D image acquisition apparatus includes a light source, an optical shutter, an image sensor, an image signal processor, and a controller. The light source is configured to project illumination light on an object. The optical shutter is configured to modulate the illumination light reflected from the object with a predetermined gain waveform. The image sensor is configured to generate a depth image by detecting the illumination light modulated by the optical shutter. The image signal processor is configured to calculate a distance from the 3D image acquisition apparatus to the object using the depth image generated by the image sensor. The controller is configured to control an operation of the light source and an operation of the optical shutter.

19 Claims, 4 Drawing Sheets

(51) Int. Cl.
*G01S 17/89* (2006.01)
*G01S 7/481* (2006.01)

(58) Field of Classification Search
USPC .......................................................... 348/46
See application file for complete search history.

(56) References Cited

U.S. PATENT DOCUMENTS

| | | | |
|---|---|---|---|
| 6,037,922 A * | 3/2000 | Yagyu | G09G 3/3406 345/89 |
| 6,057,909 A * | 5/2000 | Yahav | G01C 11/025 313/103 CM |
| 6,088,086 A | 7/2000 | Muguira et al. | |
| 6,100,517 A | 8/2000 | Yahav et al. | |
| 6,118,946 A | 9/2000 | Ray et al. | |
| 6,331,911 B1 | 12/2001 | Manassen et al. | |
| 6,794,628 B2 | 9/2004 | Yahav et al. | |
| 6,856,355 B1 | 2/2005 | Ray et al. | |
| 7,095,487 B2 | 8/2006 | Gonzalez-Banos et al. | |
| 7,230,685 B2 | 6/2007 | Suzuki et al. | |
| 8,289,606 B2 | 10/2012 | Park et al. | |
| 8,436,370 B2 | 5/2013 | Park et al. | |
| 8,492,863 B2 | 7/2013 | Cho et al. | |
| 2005/0162638 A1 * | 7/2005 | Suzuki | G01C 3/08 356/4.04 |
| 2007/0052636 A1 * | 3/2007 | Kalt | G09G 3/34 345/83 |
| 2007/0146860 A1 * | 6/2007 | Kikuchi | G02F 1/0123 359/239 |
| 2008/0231832 A1 * | 9/2008 | Sawachi | G01S 7/493 356/5.1 |
| 2010/0177372 A1 | 7/2010 | Park et al. | |
| 2010/0182671 A1 | 7/2010 | Park | |
| 2010/0308211 A1 * | 12/2010 | Cho | H01L 27/14625 250/214 R |
| 2010/0321755 A1 * | 12/2010 | Cho | G01S 7/4816 359/248 |
| 2010/0328750 A1 | 12/2010 | Kim et al. | |
| 2011/0074659 A1 | 3/2011 | Park et al. | |
| 2011/0176709 A1 * | 7/2011 | Park | G06T 7/0057 382/106 |
| 2012/0069176 A1 * | 3/2012 | Park | G01S 17/89 348/135 |
| 2012/0162380 A1 | 6/2012 | Cho et al. | |
| 2013/0101176 A1 | 4/2013 | Park et al. | |
| 2013/0175500 A1 | 7/2013 | Cho et al. | |
| 2013/0201183 A1 | 8/2013 | Park et al. | |

FOREIGN PATENT DOCUMENTS

| | | |
|---|---|---|
| KR | 10-2010-0130782 A | 12/2010 |
| KR | 10-2010-0135548 A | 12/2010 |
| KR | 10-2011-0088880 A | 8/2011 |
| KR | 10-2012-0069406 A | 6/2012 |
| KR | 1020120061379 A | 6/2012 |
| KR | 10-2012-0075182 A | 7/2012 |
| KR | 10-2012-0077417 A | 7/2012 |
| KR | 10-2012-0130937 A | 12/2012 |

OTHER PUBLICATIONS

Yong-Hwa Park, et al; "Micro optical system based 3D imaging for full HD depth image capturing"; Invited Paper, Best Paper Award; Proc. of SPIE; 2012, vol. 8252; pp. 82520X-1-82520X-15.

* cited by examiner

3D IMAGE ACQUISITION APPARATUS AND METHOD OF DRIVING THE SAME

CROSS-REFERENCE TO RELATED APPLICATION

This application claims priority from Korean Patent Application No. 10-2013-0057955, filed on May 22, 2013, in the Korean Intellectual Property Office, the disclosure of which is incorporated herein in its entirety by reference.

BACKGROUND

1. Field

Exemplary embodiments relate to 3-dimensional (3D) image acquisition apparatuses and methods of driving the same. In particular, exemplary embodiments relate, to 3D image acquisition apparatuses and methods of driving the same, which may improve depth resolution and reduce power consumption.

2. Description of the Related Art

Research has been increasing in the fields of 3-dimensional (3D) cameras, motion sensors, and laser radars (LADARs) capable of acquiring distance information to an object. In particular, research has been occurring in the field of 3D content because of increased demand for 3D display apparatuses capable of displaying an image having a sense of depth. Accordingly, research is being conducted into various 3D image acquisition apparatuses that enable users to produce 3D content.

A binocular stereo vision method, which uses two cameras or a triangulation method using structured light and a camera, may be used to obtain depth information about the distances between a 3D image acquisition apparatus and the surfaces of an object. However, in this method, it is difficult to obtain accurate depth information because the accuracy of depth information depends on the surface state of an object and degrades rapidly as the distance to the object increases.

In order to solve this problem, a time-of-flight (TOF) method may be used. TOF technology is a method of measuring the flight time of light until the light reflected from an object is received by a light-receiving unit after illumination light is irradiated onto the object. According to the TOF technology, an illumination optical system, including a light-emitting diode (LED) or a laser diode (LD), is used to project light of a certain wavelength (e.g., 850 nm near-infrared ray) onto an object, and light of the same wavelength reflected from the object is received by a light-receiving unit. Then, a series of processing operations, such as modulation of the received light by an optical shutter having a known gain waveform, are performed to extract depth information. Various TOF technologies have been introduced according to the series of optical processing operations.

In a related art, a 3D image acquisition apparatus employing a TOF technology includes an illumination optical system for emitting illumination light and an imaging optical system for acquiring an image of an object in order to obtain depth information. Further, the imaging optical system may include a color image sensor for generating a general color image by detecting visible light reflected from the object, an optical shutter for modulating the illumination light reflected from the object with a predetermined gain waveform, and a gray-scale image sensor for generating a depth image having depth information by detecting the modulated illumination light.

SUMMARY

Exemplary embodiments may provide 3-dimensional (3D) image acquisition apparatuses and methods of driving the same, which may improve depth resolution and reduce power consumption.

Additional aspects will be set forth in part in the description which follows and, in part, will be apparent from the description, or may be learned by practice of the presented embodiments.

According to an aspect of the exemplary embodiments, a 3D image acquisition apparatus includes: a light source configured to project illumination light on an object; an optical shutter configured to modulate the illumination light reflected from the object with a predetermined gain waveform; an image sensor configured to generate a depth image by detecting the illumination light modulated by the optical shutter; an image signal processor configured to calculate a distance from the 3D image acquisition apparatus to the object using the depth image generated by the image sensor; and a controller configured to control an operation of the light source and an operation of the optical shutter, wherein, while the image sensor is capturing the depth image of one frame, the controller is configured to control the optical shutter such that a first interval, in which the optical shutter modulates the illumination light, and a second interval, in which the optical shutter does not modulate the illumination light and does not transmit light, are repeated a plurality of times.

The optical shutter may be configured to modulate the illumination light with the predetermined gain waveform for only one period in each first interval.

The optical shutter may be configured to continuously modulate the illumination light with the predetermined gain waveform for at least two periods in each first interval.

A length of the first interval may be an integer multiple of one period of the predetermined gain waveform.

The first interval may be longer than the second interval.

The controller may be configured to apply a first bias voltage capable of obtaining a maximum transmittance range to the optical shutter in the first interval in which the optical shutter modulates the illumination light, and to apply a second bias voltage capable of blocking light transmission by closing the optical shutter to a maximum in the second interval in which the optical shutter does not modulate the illumination light.

While the image sensor is capturing the depth image of one frame, the controller may be configured to control the light source such that the light source emits the illumination light in the first interval and does not emit the illumination light in the second interval.

The light source and the optical shutter may operate in synchronization with each other.

The light source may emit the illumination light for only one period in each first interval.

The light source may continuously emit the illumination light for at least two periods in each first interval.

The light source and the optical shutter may be synchronized with each other such that the light source emits the illumination light for only one period at one time in each first interval, and the optical shutter modulates the reflected illumination light with the predetermined gain waveform for only one period.

According to another aspect of the exemplary embodiments, there is provided a method of driving a 3D image acquisition apparatus including projecting illumination light onto an object; modulating the illumination light reflected from the object with a predetermined gain waveform; generating a depth image by detecting the illumination light modulated by an optical shutter; calculating a distance from the 3D image acquisition apparatus to the object using the depth image generated by an image sensor; and controlling an operation of a light source and an operation of the optical shutter, wherein, while capturing the depth image of one frame, the optical shutter is controlled such that a first interval, in which the illumination light is modulated, and a second interval, in which the illumination light is not modulated and does not transmit light, are repeated a plurality of times.

According to another aspect of the exemplary embodiments, there is provided a method of driving an optical shutter including modulating an illumination light during a first interval of a generated depth image of one frame; not modulating and not transmitting light during a second interval of the generated depth image of one frame; and repeating the first interval and the second interval a plurality of time during the generated depth image of one frame, wherein the first interval is a longer time interval time than the second interval.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Figure 1:
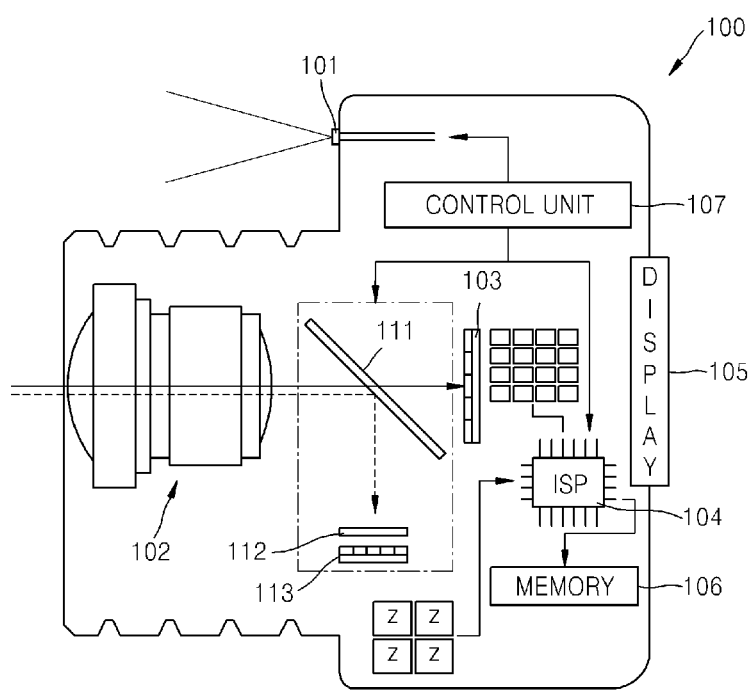
FIG. 1 is a schematic diagram schematically illustrating a configuration of a 3D image acquisition apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, 3-dimensional (3D) image acquisition apparatuses and methods of driving the same will be described in detail with reference to the accompanying drawings. Like reference numerals in the drawings denote like elements, and the sizes of respective elements in the drawings may be exaggerated for the sake of clarity and convenience.

FIG. 1 is a schematic diagram schematically illustrating a configuration of a 3D image acquisition apparatus 100 according to an embodiment.

Referring to FIG. 1, the 3D image acquisition apparatus 100 may include a light source 101 that generates illumination light with a predetermined wavelength, an object lens 102 that focuses illumination light and visible light reflected from an external object (not illustrated), a first image sensor 103 that generates a color image by detecting the visible light focused by the object lens 102, an optical shutter 112 that modulates the illumination light reflected from the object with a predetermined gain waveform, a second image sensor 113 that generates a depth image by detecting the illumination light modulated by the optical shutter 112, a beam splitter 111 that separates the visible light and the illumination light, provides the visible light to the first image sensor 103, and provides the illumination light to the second image sensor 113, an image signal processing unit 104 that generates a 3D image by using the color image and the depth image, and a control unit 107 that controls operations of the light source 101, the first image sensor 103, the optical shutter 112, the second image sensor 113, and the image signal processing unit 104. Also, the 3D image acquisition apparatus 100 may further include a memory 106 that stores the final 3D image, and a display panel 105 that displays the 3D image. The control unit 107 may further include at least one of a processor, a circuit, and a hardware module for controlling operations of the light source 101, the first image sensor 103, the optical shutter 112, the second image sensor 113, and the image signal processing unit 104.

The light source 101 may be, e.g., a light-emitting diode (LED) or a laser diode (LD) that emits illumination light with about an 850 nm near-infrared (NIR) wavelength. The 850 nm near infrared (NIR) wavelength is invisible to the human eye, such that the human eye is protected. However, this is merely exemplary. Illumination light of a different suitable wavelength band and a different type of light source may be used according to a particular design. Also, the light source 101 may project illumination light with a specially-defined waveform, such as a sine wave, a ramp wave, and a square wave, onto the object according to a control signal received from the control unit 107.

The beam splitter 111 may be coated, e.g., with a wavelength-division filter that transmits light of a visible band and reflects light of an NIR band. FIG. 1 illustrates that the beam splitter 111 transmits visible light and reflects illumination light. However, this configuration is merely exemplary. According to another design, the beam splitter 111 may transmit illumination light and reflect visible light. In the following description, for the sake of convenience, it is assumed that the beam splitter 111 transmits visible light and reflects illumination light.

The optical shutter 112 modulates the illumination light reflected from the object with a predetermined gain waveform according to a time-of-flight (TOF) method in order to obtain depth information about the object. For example, the optical shutter 112 may be a gallium arsenide (GaAs)-based semiconductor modulator that is capable of tens to hundreds of MHz ultrahigh-speed driving. A period of the gain waveform of the optical shutter 112 may be equal to a period of the illumination light generated by the light source 101. The gain waveform of the optical shutter 112 may also have a specially-defined waveform, such as a sine wave, a ramp wave, and a square wave, according to a control signal received from the control unit 107.

The first image sensor 103 and the second image sensor 113 may be, e.g., a semiconductor image pickup device, such as a charge-coupled device (CCD) or a complementary metal oxide semiconductor (CMOS) device. The first image sensor 103 and the second image sensor 113 include a plurality of pixels, and each pixel converts the light intensity of incident light into an electrical signal and outputs the electrical signal. The first image sensor 103 for generating a general color image may have a higher resolution than the second image sensor 113 for generating a depth image having only depth information. Also, the first image sensor 103 may be a color image sensor, whereas the second image sensor 113 may be a gray-scale image sensor.

Hereinafter, an operation of the 3D image acquisition apparatus 100 will be briefly described. First, the light source 101 projects, e.g., NIR illumination light onto the object under the control of the control unit 107. For example, the light source 101 may irradiate illumination light having a predetermined period and waveform onto the object according to the TOF method. Thereafter, the NIR illumination light reflected by the object is focused by the object lens 102. At the same time, the general visible light reflected from the object is also focused by the object lens 102. Of the light focused by the object lens 102, the visible light passes the beam splitter 111 and enters the first image sensor 103. Like an image pickup device of a general camera, the first image sensor 103 may generate a color image having red (R), green (G) and blue (B) components for respective pixels.

On the other hand, the illumination light focused by the object lens 102 is reflected by the beam splitter 111 and enters the optical shutter 112. The phase of the illumination light entering the optical shutter 112 is delayed according to the distance between the object and the 3D image acquisition apparatus 100, i.e., the depth thereof. Therefore, when a phase delay value of the illumination light is accurately measured, the distance between the object and the 3D image acquisition apparatus 100 may also be known. In order to obtain the phase delay value of the illumination light reflected from the object, the optical shutter 112 amplitude-modulates the illumination light with a predetermined gain waveform under the control of the control unit 107. For example, the optical shutter 112 may sequentially modulate the illumination light with at least three gain waveforms that have the same period as the illumination light and have different phases.

The second image sensor 113 generates a depth image through each pixel converting the light intensity of the modulated illumination light into an electrical signal. For example, the second image sensor 113 may sequentially generate at least three depth images that respectively correspond to at least three gain waveforms of the optical shutter 112. Thereafter, the depth images output from the second image sensor 113 may be input to the image signal processing unit 104. The image signal processing unit 104 may generate the final 3D image by calculating the distance between the object and the 3D image acquisition apparatus 100 with respect to each pixel using at least three depth images received from the second image sensor 113, and combining the calculation result with the color image received from the first image sensor 103. For example, the generated 3D image may be stored in the memory 106 or may be displayed on the display panel 105.

A process of extracting the depth information by the image signal processing unit 104 is mathematically modeled as follows:

First, reflected illumination light, which is reflected from the object and returns to the 3D image acquisition apparatus 100, may be expressed in Equation 1 below:

$$P_{LD} = a\,\cos(\omega t + \varphi_{obj}) + b \quad \text{[Equation 1]}$$

In Equation 1, unknown quantities are a reflectance "a" of the object, a magnitude "b" of the external light component, and a phase delay "$\varphi_{obj}$". A frequency "$\omega$" of the illumination light is a known value that is determined by the control unit 107. Since there are three unknown quantities, at least three equations are necessary to obtain the phase delay.

Therefore, the optical shutter 112 may modulate the reflected illumination light expressed by Equation 1 with three gain waveforms having different phases, as shown in Equation 2 below:

$$T_{\varphi_1} = c\,\cos(\omega t + \varphi_1) + d$$

$$T_{\varphi_2} = c\,\cos(\omega t + \varphi_2) + d$$

$$T_{\varphi_3} = c\,\cos(\omega t + \varphi_3) + d \quad \text{[Equation 2]}$$

In Equation 2, "c" is the amplitude of the gain waveform, "d" is the DC component of the gain waveform, and "$\varphi_1, \varphi_2,$ and $\varphi_3$" are the respective phases of the gain waveforms.

The illumination light modulated by the optical shutter 112 corresponds to the product of signals expressed by Equations 1 and 2, and arrives at the second image sensor 113. Thereafter, the second image sensor 113 may generate a depth image by sequentially exposing illumination lights, which are modulated with three gain waveforms having different phases, for a predetermined exposure time T. For example, the exposure time T may be equal to the period of one frame of the image. A brightness value of the generated depth image may be expressed in Equation 3 below:

$$I_i(\phi_{obj}) = \int_0^T P_{LD} T_{\phi_i}\,dt$$

$$= \frac{1}{2}acT\cos(\phi_{obj} + \phi_i) + bdt\ (i = 1, 2, 3) \quad \text{[Equation 3]}$$

In Equation 3, "i" is an identifier for identifying three depth images generated by modulation with three gain waveforms having different phases.

For example, when $\varphi_1=0$, $\varphi_2=\beta$, and $\varphi_3=2\beta$ are set in Equation 3, a phase delay is obtained in Equation 4 below:

$$\phi_{obj} = \tan^{-1}\left\{\frac{I_3 - 2I_2 + I_1}{I_1 - I_3}\right\} \quad \text{[Equation 4]}$$

From the phase delay value obtained by Equation 4, the distance between the object and the 3D image acquisition apparatus 100 may be obtained in Equation 5:

$$\text{distance} = \frac{\phi_{obj}}{4\pi}\frac{c}{f} \quad \text{[Equation 5]}$$

In Equation 5, "f" is the frequency of the illumination light, and "c" is the speed of light. When calculation is performed by all pixels of the second image sensor 113 in this way, a depth image representing distance information may be obtained. Equations 1 to 5 are based on a method in which the light source 101 emits one illumination light of the same phase, and the optical shutter 112 modulates the illumination light with a plurality of gain waveforms having different phases. However, the same result may be obtained even when the light source 101 emits a plurality of illumination lights having different phases, and the optical shutter 112 modulates the plurality of illumination lights with one gain waveform of the same phase.

In the above depth information extraction method, a demodulation contrast and a depth resolution are greatly affected by the performance of the optical shutter 112. As described above, the optical shutter 112 is a GaAs-based semiconductor modulator capable of tens to hundreds of MHz ultrahigh-speed driving, and has a structure in which an active layer absorbing light according to electrical control is disposed in a Fabry-Perot resonator.

However, when the optical shutter 112 is operated for extraction of the depth information, heat proportional to the square of an AC driving voltage and thus the frequency of a driving signal is generated. Accordingly, the temperature of the optical shutter 112 rises. In a related art, as the temperature of the optical shutter 112 rises, the resonant wavelength of the optical shutter 112 shifts to a longer wavelength, and the variation of the absorption wavelength in the active layer is greater than the variation of the resonant frequency. For example, in the case of a GaAs-based optical shutter as the optical shutter 112, the temperature-dependent change of the resonant wavelength is about 0.1 nm/° C. to about 0.2 nm/° C., and the temperature-dependent change of the absorption wavelength is about 0.293 nm/° C. Therefore, as the temperature of the optical shutter 112 rises, the absorption wavelength further approaches the resonant wavelength. When the absorption wavelength approaches the resonant wavelength, the difference between the transmittance of the optical shutter 112 in the case where the maximum voltage is applied to the optical shutter 112 and the transmittance of the optical shutter 112 in the case where no voltage is applied to the optical shutter 112 decreases. Thus, the demodulation contrast decreases. As a result, the depth resolution may decrease. Also, when the temperature rises excessively, the optical shutter 112 may be damaged.

Figure 2A:
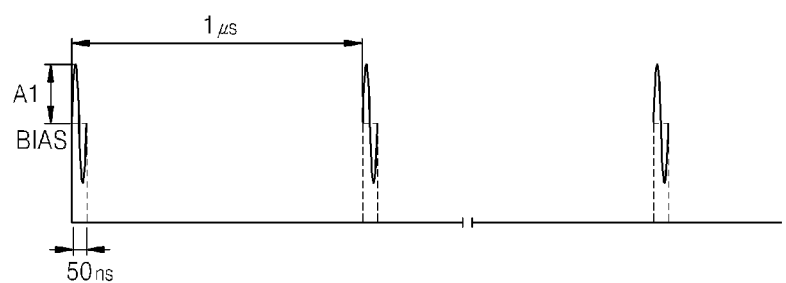
FIGS. 2A to 2C are timing diagrams comparatively illustrating a discrete driving method of an optical shutter according to an embodiment and a continuous driving method of an optical shutter according to the related art.
Figure 2B:
Figure 2C:
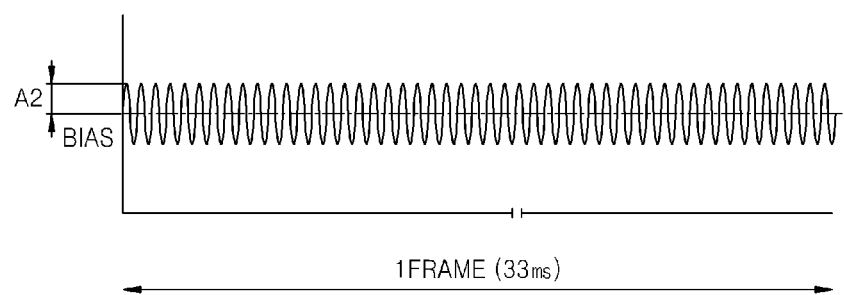

Therefore, according to the present embodiment, the optical shutter 112 is discretely driven in order to suppress the temperature rise of the optical shutter 112. FIGS. 2A to 2C are timing diagrams comparatively illustrating a discrete driving method of the optical shutter 112 according to an embodiment and a continuous driving method of an optical shutter according to the related art. FIG. 2A illustrates a discrete driving method according to the present embodiment. FIG. 2B illustrates a bias voltage applied to the optical shutter 112 in the discrete driving method according to the present embodiment. FIG. 2C illustrates the continuous driving method according to the related art.

Referring to FIG. 2C, in the driving method according to the related art, during the generation of a depth image of one frame, i.e., during the exposure time T of the second image sensor 113, the optical shutter 112 continuously modulates the reflected illumination light. In contrast, referring to FIG. 2A, in the driving method according to the present embodiment, during the generation of a depth image of one frame, the optical shutter 112 operates discretely and modulates the reflected illumination light intermittently. This operation of the optical shutter 112 may be controlled by the control unit 107 of the 3D image acquisition apparatus 100. For example, while the second image sensor 113 is capturing a depth image of one frame, the control unit 107 may control the optical shutter 112 such that a first interval in which the optical shutter 112 modulates the illumination light and a second interval in which the optical shutter 112 does not modulate the illumination light and does not transmit light are repeated a plurality of times.

For example, as illustrated in FIG. 2A, when the period of one gain waveform of the optical shutter 112 is about 50 ns, the optical shutter 112 may modulate the illumination light with one gain waveform about every 1 μs. In other words, the optical shutter 112 may repeat the first interval of 50 ns and the second interval of 0.95 μs for a one-frame period (e.g., about 33 ms). Also, as illustrated in FIG. 2B, the bias voltage applied to the optical shutter 112 is not maintained constant. In the first interval in which the optical shutter 112 modulates the illumination light, a bias voltage capable of obtaining the maximum transmittance range is applied to the optical shutter 112. In the second interval in which the optical shutter 112 does not modulate the illumination light, a bias voltage capable of blocking light transmission by closing the optical shutter 112 to the maximum may be applied to the optical shutter 112.

Figure 4:
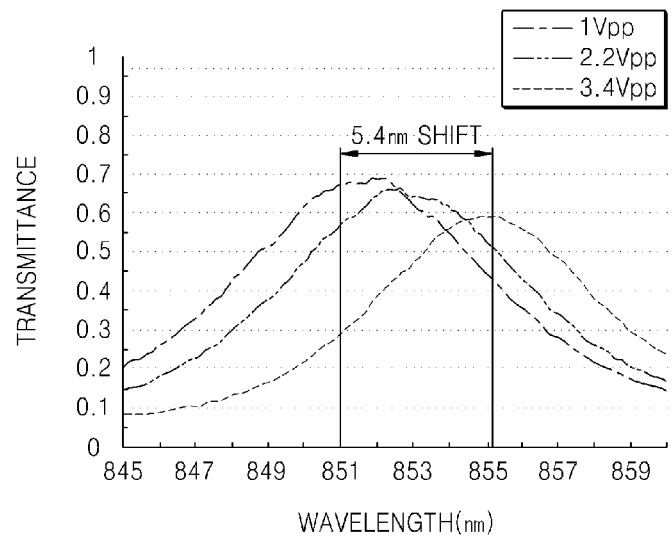
FIG. 4 is a graph illustrating the result of a shift of a central absorption wavelength of an optical shutter in the case of continuous driving.
Figure 5:
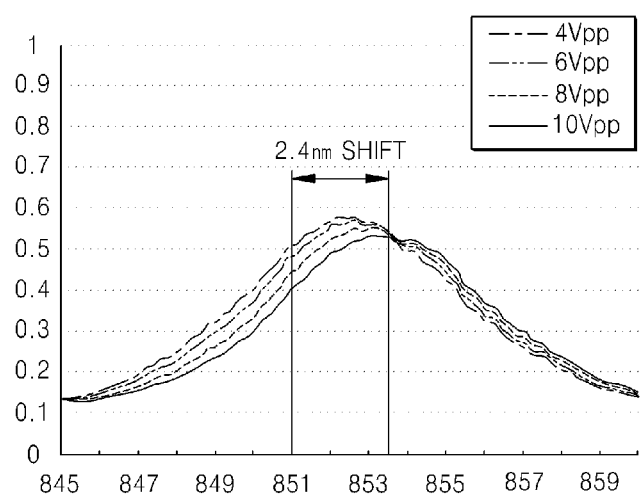
FIG. 5 is a graph illustrating the result of a shift of a central absorption wavelength of an optical shutter in the case of discrete driving.

According to the present embodiment described above, since the power consumption of the optical shutter 112 in the example of FIGS. 2A and 2B is reduced to about 1/20 as compared with the continuous driving method of FIG. 2C, the temperature rise of the optical shutter 112 may also be suppressed to a similar amount. Therefore, it is possible to prevent the absorption wavelength of the optical shutter 112 from being different from the wavelength of the illumination light. For example, FIG. 4 is a graph illustrating the result of a shift of the central absorption wavelength of the optical shutter 112 in the case of continuous driving according to the related art, and FIG. 5 is a graph illustrating the result of a shift of the central absorption wavelength of the optical shutter 112 in the case of discrete driving according to the present embodiment. Referring to the graph of FIG. 4, when continuous driving is performed with a frequency of about 20 MHz and an AC signal of about 3.4 Vpp, the central absorption wavelength of the optical shutter 112 shifted to about a 5.4 nm longer wavelength as compared with the case where an AC signal was not applied thereto. The temperature change of the optical shutter 112 was equal to or greater than about 30° C. On the other hand, referring to the graph of FIG. 5, in the discrete driving according to the present embodiment, a shift to only about a 2.4 nm longer wavelength occurred even when driving is performed with a frequency of about 20 MHz and an AC signal of about 10 Vpp.

According to the present embodiment, the temperature rise is not significant even when the amplitude of the gain waveform of the optical shutter 112 is increased. Therefore, the transmittance variation of the optical shutter 112 may be increased by increasing the amplitude of the gain waveform of the optical shutter 112. For example, the amplitude A1 of the gain waveform in FIG. 2A may be made to be greater than the amplitude A2 of the gain waveform illustrated in FIG. 2C. In the case of continuous driving method, the amplitude A2 of the gain waveform could not be increased due to the temperature rise of the optical shutter 112. However, in the case of discrete driving method according to the present embodiment, since the temperature rise of the optical shutter 112 may be suppressed, the amplitude A1 of the gain waveform may be relatively increased. When the amplitude A1 of the gain waveform is increased, the transmittance variation of the optical shutter 112 may be increased. Thus, the demodulation contrast may be increased. Also, according to the present embodiment, since the optical shutter 112 does not transmit light during the second interval in which the illumination light is modulated, an error caused by the accumulation of an external light component may be reduced. Further, it is possible to prevent the second image sensor 113 from being saturated due to the accumulation of an external light component.

FIGS. 2A and 2B illustrate that the optical shutter 112 modulates the illumination light with one gain waveform about every 1 μs. However, the modulation is merely exemplary and the present embodiment is not limited thereto. The period of the second interval that is a non-driving interval may be selected differently according to the characteristics of the optical shutter 112 and the second image sensor 113. For example, the optical shutter 112 may be driven with one gain waveform about every 2 μs, or may be driven with one gain waveform about every 0.5 μs. Also, in the first interval that is a driving interval, the number of gain waveforms may be selected suitably according to the characteristics of the optical shutter 112 and the second image sensor 113. For example, the optical shutter 112 may be controlled to continuously modulate the illumination light with at least two gain waveforms in the first interval. Accordingly, the length of the first interval may be an integer multiple of the period of the gain waveform. Herein, the length of the first interval may be greater than the length of the second interval.

On the other hand, as in the optical shutter 112, in the case of the light source 101, the wavelength of the illumination light also changes according to the temperature rise. For example, when a semiconductor laser diode is used as the light source 101, the temperature-dependent change of the wavelength of the illumination light is about 0.3 nm/° C. When the wavelength of the illumination light changes, the wavelength of the illumination light becomes different from the resonant wavelength of the optical shutter 112. As a result, the difference between the transmittance of the optical shutter 112 in the case where the maximum voltage is applied thereto and the transmittance of the optical shutter 112 in the case where no voltage is applied thereto may be reduced. Further, the output of the semiconductor laser diode decreases as the temperature rises.

Figure 3A:
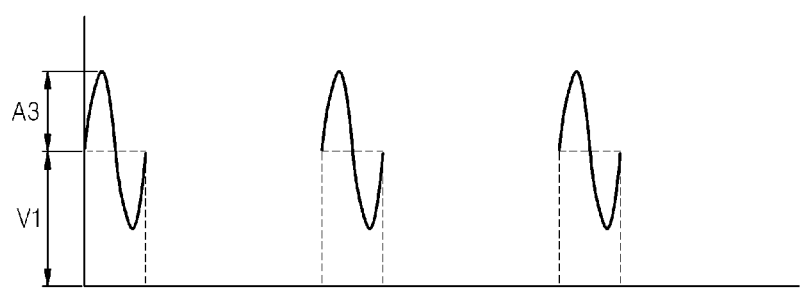
FIGS. 3A and 3B are timing diagrams comparatively illustrating a discrete driving method of a light source, according to an embodiment, and a continuous driving method of a light source, according to the related art, respectively.
Figure 3B:
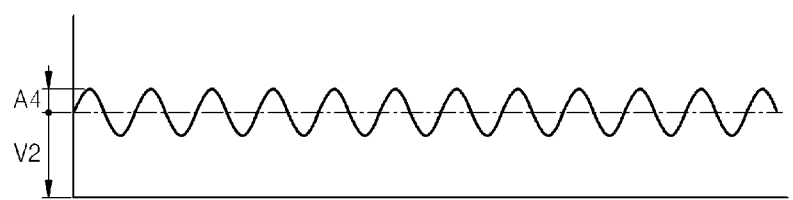

According to the present embodiment, the light source 101 may be discretely driven in order to suppress the temperature rise of the light source 101. FIGS. 3A and 3B are timing diagrams comparatively illustrating a discrete driving method of the light source 101 according to an embodiment and a continuous driving method of a light source according to the related art, respectively. FIG. 3A illustrates the discrete driving method of the light source 101, according to the present embodiment. FIG. 3B illustrates the continuous driving method according to the related art.

Referring to FIG. 3B, in the driving method according to the related art, during the generation of a depth image of one frame, the light source 101 continuously emits illumination light. In contrast, referring to FIG. 3A, in the driving method according to the present embodiment, the light source 101 operates discretely and emits illumination light intermittently. This operation of the light source 101 may be controlled by the control unit 107 of the 3D image acquisition apparatus 100. For example, while the second image sensor 113 is capturing a depth image of one frame, by synchronizing the light source 101 with the optical shutter 112, the control unit 107 may control the light source 101 such that the light source 101 does not emit the illumination light in the second interval and emits the illumination light in the first interval in which the optical shutter 112 modulates the illumination light. For example, the light source 101 may emit illumination light for one period about every 1 μs. Also, the light source 101 may emit illumination light for at least two periods in the first interval.

As described above, according to the one or more of the above embodiments, since the power consumption of the light source 101 is reduced to about ½₀ as compared with the continuous driving method, the temperature rise of the light source 101 may be suppressed to a similar amount. Therefore, the wavelength of the illumination light may be prevented from changing significantly due to the temperature rise of the light source 101, and the output may be prevented from degrading. Also, according to the present embodiment, since the temperature rise of the light source 101 is not significant, the instantaneous output of the light source 101 may be increased. For example, the amplitude A3 of the illumination light in FIG. 3A may be greater than the amplitude A4 illustrated in FIG. 3B, and the bias voltage V1 applied to the light source 101 in FIG. 3A may also be greater than the bias voltage V2 in FIG. 3B. For example, when the first interval that is a driving interval of the light source 101 and the optical shutter 112 is ½₀ of the image generation interval of one frame, the reduction of exposure dose in the second image sensor 113 may be compensated for by increasing the instantaneous output of the light source 101 by up to 20 times as compared with the continuous driving method. Also, according to the present embodiment, since the emission of illumination light is reduced, it may be more advantageous for eye safety.

When the light source 101 is synchronized with the optical shutter 112 such that the light source 101 emits illumination light for only one period at one time and the optical shutter 112 modulates the illumination light with the gain waveform for only one period, several effects may be achieved. According to a related art TOF method, when a 50 ns period of illumination light and a gain waveform are used, one period of a phase delay corresponds to a distance of about 7.5 m. Therefore, the distance of an object spaced apart by 7.5 m or more may not be accurately identified. For example, an object located at a distance of about 8 m may be recognized as being located at a distance of about 0.5 m. However, in the exemplary embodiments, when the light source 101 emits illumination light for only one period at one time and the optical shutter 112 modulates the illumination light with the gain waveform for only one period, the illumination light reflected from an object located at a distance of about 7.5 m or more arrives at the optical shutter 112 after the modulation of the optical shutter 112. Therefore, since the illumination light reflected from the object located at a distance of about 7.5 m or more does not contribute to the generation of a depth image, the image signal processing unit 104 may determine that the object is spaced apart by 7.5 m or more from a region of the depth image in which no illumination light component is present.

Exemplary embodiments of the 3D image acquisition apparatuses and the methods of driving the same have been described and illustrated in the accompanying drawings. However, it should be understood that the exemplary embodiments should be considered in a descriptive sense only and not for purposes of limitation. It should also be understood that the exemplary embodiments is not limited to the above description and illustration. This is because various changes may be made therein by those skilled in the art.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A 3-dimensional (3D) image acquisition apparatus, comprising:
    a light source configured to project illumination light onto an object;
    an optical shutter configured to modulate the illumination light reflected from the object with a predetermined gain waveform;
    an image sensor configured to generate a depth image by detecting the illumination light modulated by the optical shutter; and
    a controller configured to control an operation of the light source and an operation of the optical shutter,
    wherein, while the image sensor is capturing the depth image of one frame, the controller is configured to control the optical shutter such that a first interval, in which the optical shutter modulates the illumination light, and a second interval, in which the optical shutter does not modulate the illumination light and does not transmit light, are repeated a plurality of times,
    wherein the controller is configured to apply a first bias voltage capable of obtaining a maximum transmittance range to the optical shutter in the first interval in which the optical shutter modulates the illumination light, and
    wherein a length of the second interval is greater than a length of the first interval.

2. The 3D image acquisition apparatus of claim 1, wherein the optical shutter is configured to modulate the illumination light with the predetermined gain waveform for only one period in each first interval.

3. The 3D image acquisition apparatus of claim 1, wherein the optical shutter is configured to continuously modulate the illumination light with the predetermined gain waveform for at least two periods in each first interval.

4. The 3D image acquisition apparatus of claim 3, wherein a length of the first interval is an integer multiple of one period of the predetermined gain waveform.

5. The 3D image acquisition apparatus of claim 1, wherein the controller is further configured to apply a second bias voltage capable of blocking light transmission by closing the optical shutter to a maximum in the second interval in which the optical shutter does not modulate the illumination light.

6. The 3D image acquisition apparatus of claim 1, wherein, while the image sensor is capturing the depth image of one frame, the controller is configured to control the light source such that the light source emits the illumination light in the first interval and does not emit the illumination light in the second interval.

7. The 3D image acquisition apparatus of claim 6, wherein the light source and the optical shutter operate in synchronization with each other.

8. The 3D image acquisition apparatus of claim 6, wherein the light source emits the illumination light for only one period in each first interval.

9. The 3D image acquisition apparatus of claim 6, wherein the light source continuously emits the illumination light for at least two periods in each first interval.

10. The 3D image acquisition apparatus of claim 6, wherein the light source and the optical shutter are synchronized with each other such that the light source emits the illumination light for only one period at one time in each first interval, and the optical shutter modulates the reflected illumination light with the predetermined gain waveform for only one period.

11. The 3D image acquisition apparatus of claim 1, further comprising an image signal processor configured to calculate a distance from the 3D image acquisition apparatus to the object using the depth image generated by the image sensor.

12. A method of driving a 3-dimensional (3D) image acquisition apparatus, the method comprising:
    projecting illumination light onto an object;
    modulating the illumination light reflected from the object with a predetermined gain waveform;
    generating a depth image by detecting the illumination light modulated by an optical shutter;
    calculating a distance from the 3D image acquisition apparatus to the object using the depth image generated by an image sensor; and
    controlling an operation of a light source and an operation of the optical shutter,
    wherein, while capturing the depth image of one frame, the optical shutter is controlled such that a first interval, in which the illumination light is modulated, and a second interval, in which the illumination light is not modulated and does not transmit light, are repeated a plurality of times,
    wherein a first bias voltage capable of obtaining a maximum transmittance range is applied to the optical shutter in the first interval in which the optical shutter modulates the illumination light, and
    wherein a length of the second interval is greater than a length of the first interval.

13. The method of claim 12, wherein the illumination light is modulated with the predetermined gain waveform for only one period in each first interval.

14. The method of claim 12, wherein the illumination light is continuously modulated with the predetermined gain waveform for at least two periods in each first interval, and a length of the first interval is an integer multiple of one period of the predetermined gain waveform.

15. The method of claim 12, wherein a second bias voltage capable of blocking light transmission by closing the optical shutter to a maximum is applied to the optical shutter in the second interval in which the optical shutter does not modulate the illumination light.

16. The method of claim 12, wherein, while the depth image of one frame is captured, the light source is controlled such that the light source emits the illumination light in the first interval and does not emit the illumination light in the second interval.

17. The method of claim 16, wherein the light source emits the illumination light for only one period in each first interval.

18. The method of claim 16, wherein the light source continuously emits the illumination light for a plurality of periods in each first interval.

19. The method of claim 16, wherein the light source and the optical shutter are synchronized with each other such that the light source emits the illumination light for only one period at one time in each first interval, and the optical shutter modulates the reflected illumination light with the predetermined gain waveform for only one period.

* * * * *